2 Sheets--Sheet 1.
E. K. HAYNES.
Lanterns.
No. 136,994. Patented March 18, 1873.
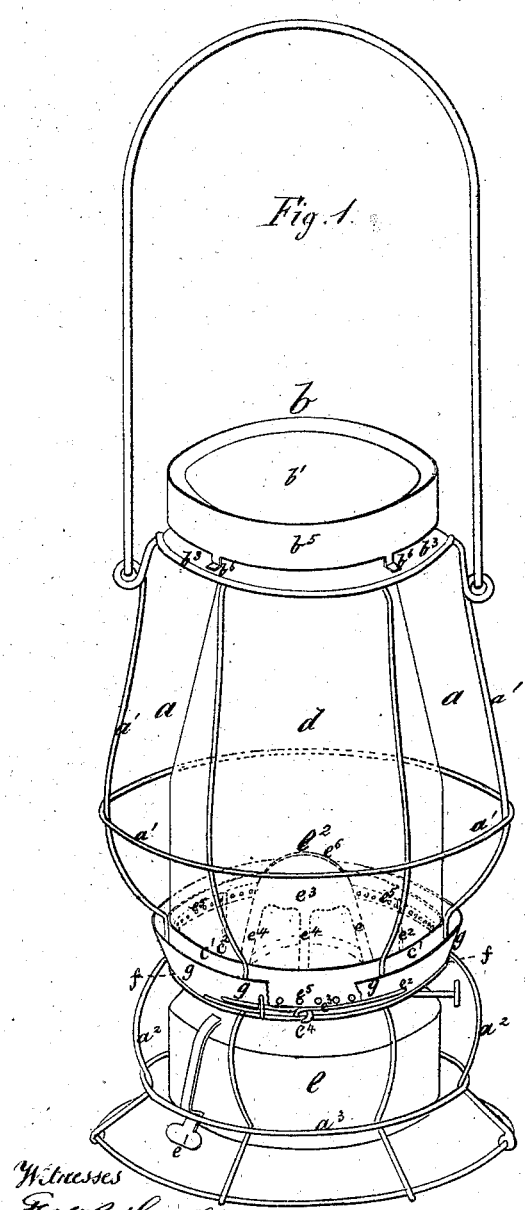
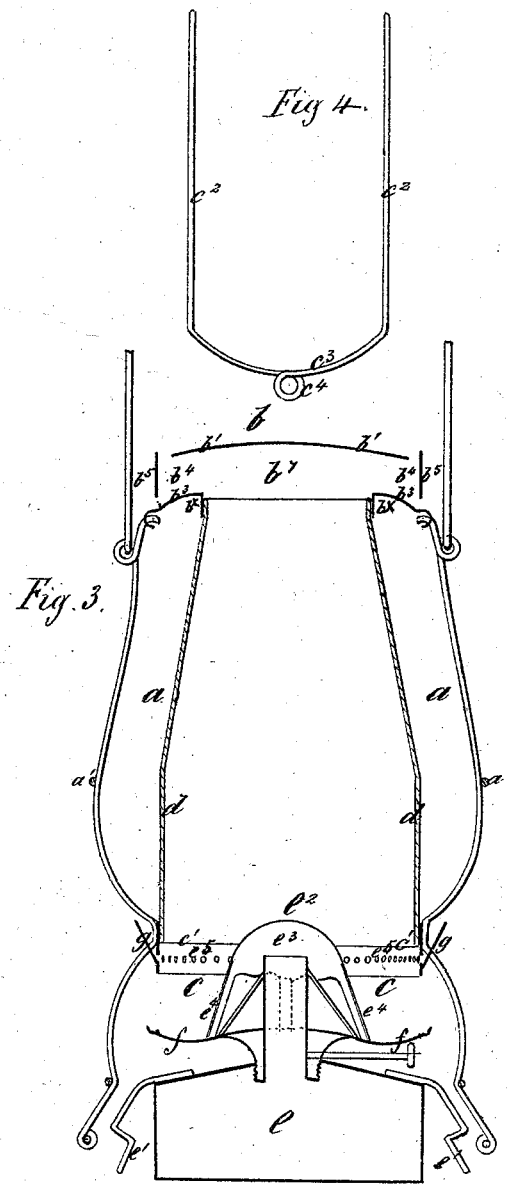

E. K. HAYNES.
Lanterns.

No. 136,994.        Patented March 18, 1873.

Witnesses
Geo. W. Rothwell
A. C. Bradley

Inventor,
Edgar K. Haynes
by Colborne Brookes & C.
his Attorneys

AM. PHOTO-LITHOGRAPHIC CO. N.Y. (OSBORNE'S PROCESS.)

UNITED STATES PATENT OFFICE.

EDGAR K. HAYNES, OF BOSTON, MASSACHUSETTS.

IMPROVEMENT IN LANTERNS.

Specification forming part of Letters Patent No. 136,994, dated March 18, 1873.

*To all whom it may concern:*

Be it known that I, EDGAR K. HAYNES, of the city of Boston, county of Suffolk and State of Massachusetts, have invented certain Improvements in Lanterns, of which the following is a specification:

My invention relates to improvements in lanterns for burning hydrocarbon oils, the object of which is to render such lanterns thoroughly portable and prevent the flame of the lamp therein from being extinguished by currents of air under any circumstances or conditions of the weather.

In carrying out my invention the inlet and outlet passages for air to and from the interior of the lantern and an impervious plate placed below the lamp-burner are so arranged that, in the event of sudden jerks of the lantern while in use, the body of air therein contained is prevented from being forced directly down upon the flame by being deflected, by a current of air conducted to the interior by a deflector, and impinging on the impervious plate in such manner that the two currents shall form a wave having a rotary or curvilinear motion, such that it will pass under the cone of the burner (which is supported on a skeleton frame) and up to the flame, so that all cushioning of the body of air against the bottom of the lantern is prevented. The air, entering at the bottom of the lantern, is conducted downward, by means of an annular deflector, to small perforations in a ring arranged beneath the globe of the lantern. It then impinges against the impervious plate, and by this means is caused to take the form of a wave having a rotary or curvilinear motion, such that the wave shall be conducted under the burner and upward to the flame through the cone of the burner at all times; and in the event of large waves of air entering the lantern on one side only, owing to the lamp being violently swung or jerked on one side, or from other cause, such wave shall pass under the burner; and in the event of there being a greater amount than can pass up through the cone of the burner to the flame, such excess shall be conducted in a wave under the burner, in a wave to the opposite side of the globe, and over the flame a sufficient distance, that no part of the wave shall impinge upon the exterior of the cone or pass down the burning aperture. The top of the lantern is formed of a plate of metal very slightly dished, and supported by uprights from a dished or curved ring forming part of the frame of the lamp, in such manner that an annular open space is left between the top plate and the curved ring. Around the annular open space, and at a slight distance from the edge of the dished top plate, a ring or annular band of metal is supported, of sufficient breadth to prevent a current of air passing directly from the exterior to the interior of the lantern. The dished top and the dished curved ring are so formed, and the annular band is formed of such breadth and fixed in such relation to the same, that currents of external air, striking the top of the lantern either in an upward, downward, or inclined direction, shall be so conducted away that they are prevented from being driven down upon the flame; and, at the same time, the currents, being so conducted away, will also carry with them any excess of air which, for the moment, (owing to a sudden jerk of the lantern, or from other cause,) may have accumulated at the top of the lantern, and assist in preserving a continuous upward draft through the lantern.

But that my invention may be fully understood, I will proceed to describe the same more in detail by aid of the accompanying drawing.

Description of the Drawing.

Figure 1 represents a perspective view, and Fig. 2 a vertical section, of a lantern constructed according to my invention. Fig. 3 represents a vertical section, showing the lamp and parts connected therewith partly removed from the lantern. Fig. 4 represents a plan of the rods used to hold the globe in position.

Figure 2:
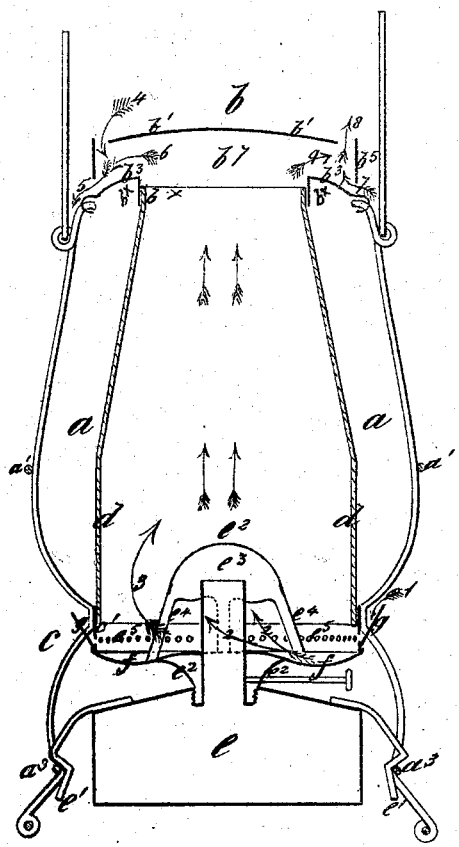

$a$ is the lantern, constructed with an external frame, $a^1$, which supports and retains the top $b$ and bottom $c$ correctly in position. $d$ is the globe, supported at its upper end in a ring, $b^*$, and at its lower end in a ring, $c^1$, and prevented from falling out by means of rods $c^2$ $c^2$ passing across the under side of the lantern. These rods $c^2$ are connected together by a cross-piece, $c^3$, provided with a loop or handle, $c^4$, as shown by Figs. 1 and 4. $a^2$ is a skeleton frame, which supports the upper frame $a^1$ of the lantern. $e$ is the lamp, which is supported and retained in the lantern by means of springs $e^1$ resting on a ring, $a^3$, forming part of the skeleton frame $a^2$. $e^2$ is the burner, and $e^3$ the cone thereof, supported on a skeleton frame, $e^4$. $f$ is the impervious plate affixed to the burner $e^2$, and, when the lamp $e$ is in position in the lantern, forms the bottom of the interior of the same. $g$ is an annular deflector for the purpose of conducting the external air down through the small openings $e^5$ in the ring $c^1$, as shown by the arrow 1 in Fig. 2; such air then impinges on the impervious plate $f$, and is thereby caused to take the form of a wave, having a rotary or curvilinear motion, such that it shall be directed under the burner $e^2$, and upward to the flame through the cone $e^3$, as represented by the arrows 2 in Fig. 2.

In the event of a greater wave of air passing in on one side of the lamp than can pass up through the cone $e^3$, such excess of air will be conducted under the burner, as shown by the arrow 3 in Fig. 2, to the opposite side of the globe, and over the flame, where it will unite with the upward current from the flame, so that no part of the wave shall impinge upon the exterior of the cone $e^3$ or pass down through the burning aperture $e^6$, Fig. 1. The top $b$ is composed of a plate, $b^1$, very slightly dished, and supported by uprights from a dished or curved ring, $b^3$, forming part of the frame $a^1$, in such manner that an annular opening, $b^4$, Fig. 3, is left between the top plate $b^1$ and the ring $b^3$. Around the annular opening $b^4$, and at a slight distance from the edge of the dished plate $b^1$, an annular band, $b^5$, is supported by uprights $b^6$, Fig. 1. This annular band $b^5$ is of such breadth and fixed in such relation to the dished plate $b^1$ and the dished ring $b^3$ that currents of air striking the top $b$ either in an upward, downward, or inclined direction, shall be prevented from being driven down upon the flame, and at the same time that such currents are conducted away they create a draft which will carry with them any excess of air which may have accumulated for the moment at the upper part $b^7$, (owing to a sudden jerk of the lantern or from other cause,) and by this means will not only assist in preserving a continuous upward draft through the lantern, but will also prevent any accumulation of air in the lantern from cushioning against the plate $b^1$, and being driven down upon the flame when the lantern is suddenly dropped.

The arrow 4, Fig. 2, represents a current striking the top of the lantern above the plate $b^1$. It will then be conducted by the annular band $b^5$ onto the upper surface of the dished ring $b^3$, and, owing to the curved form of the dished ring $b^3$, will be conducted out, as shown by the arrow 5, thereby creating in its passage a draft, as indicated by the arrow 6, Fig. 2, which will assist the upward draft of air from the burner, and carry off any momentary accumulation of air in the upper part of the lantern.

The arrow 7, Fig. 2, indicates the direction of a current of air which strikes the top of the lamp so as to enter between the ring $b^3$ and the annular band $b^5$. It will then pass out, as indicated by the arrow 8, and in so doing draw with it air from the interior of the lamp, as shown by the arrow 9.

The air contained in the interior of the globe is prevented from cushioning against the impervious plate and striking the flame when the lantern is suddenly raised by such air in its downward progress being caught, at the moment it approaches the lower part of the interior, by the current of air entering by the deflector $g$, by which it will be conducted in a rotary or curvilinear wave under the burner $e^2$, and upward to the flame through the cone $e^3$, as before described, and in the event of there being a greater wave than can pass through the cone $e^3$ the excess will be conducted round under the burner to the upward current from the flame.

The top plate $b^1$ must be only sufficiently dished to give it such an inclination as will direct currents striking the same toward the annular band $b^5$. The depth of such dishing will depend on the size of the lamp, but must not be such as to form a chamber sufficiently deep for the accumulation of air therein to any material extent.

The angle of the deflector $g$, the height of the wick-tube from the plate $f$, and the diameter of the globe must be all so arranged and adjusted in relation to each other that the curves formed by the waves of air in their passage may be such that the waves shall not impinge in a downward direction either on the exterior of the cone or the burning aperture.

The impervious plate $f$ may be formed in two parts, fitting closely one to the other, and flat instead of dished. In this case the one part would be affixed to the frame of the lantern and the other to the burner.

Having thus described my invention, what I claim, and desire to secure by Letters Patent, is—

1. An annular deflector, $g$, and perforations $e^5$, arranged in relation to an impervious plate, $f$, and the wick-tube of a lantern, substantially as and for the purposes described and set forth.

2. The combination of the dished top plate $b^1$, annular dished or curved ring $b^3$, annular opening $b^4$, and annular band $b^5$, all arranged in relation to each other substantially as and for the purposes specified.

3. In combination, the dished plate $b^1$, annular dished or curved ring $b^3$, annular open space $b^4$, annular band $b^5$, impervious plate $f$, deflector $g$, and lantern-globe, arranged and operating substantially as and for the purposes set forth.

EDGAR K. HAYNES.

Witnesses:
O. T. CRANE,
SAMUEL TUCKER.